United States Patent [19]

Bergles

[11] Patent Number: 4,973,297

[45] Date of Patent: Nov. 27, 1990

[54] MULTISPEED DRIVE HUB WITH MORE THAN THREE SPEEDS

[75] Inventor: Eduard Bergles, Graz, Austria

[73] Assignee: Fichtel & Sachs AG, Schweinfurt, Fed. Rep. of Germany

[21] Appl. No.: 418,851

[22] Filed: Oct. 10, 1989

[30] Foreign Application Priority Data

Oct. 10, 1988 [DE] Fed. Rep. of Germany ....... 3834430
Sep. 12, 1989 [DE] Fed. Rep. of Germany ....... 3930374

[51] Int. Cl.$^5$ .............................................. F16H 3/46
[52] U.S. Cl. .................................. 475/289; 192/6 A; 475/298; 475/300
[58] Field of Search ............... 475/269, 296, 298, 331, 475/337, 300, 289; 192/6 A

[56] References Cited

U.S. PATENT DOCUMENTS

| | | | |
|---|---|---|---|
| 880,578 | 3/1908 | Saunders | 475/289 |
| 1,490,644 | 4/1924 | Sturmey et al. | 475/298 |
| 3,134,274 | 5/1964 | Schwerdhofer | 192/6 A |
| 3,166,171 | 1/1965 | Schwerdhofer et al. | 192/6 A |
| 3,438,283 | 1/1967 | Schwerdhofer | 475/300 |
| 4,059,028 | 11/1977 | Schulz et al. | 192/6 A |
| 4,721,013 | 1/1988 | Stever et al. | 475/289 |

FOREIGN PATENT DOCUMENTS

3440071 5/1986 Fed. Rep. of Germany.
921909 3/1963 United Kingdom.
2166503 11/1985 United Kingdom.

*Primary Examiner*—Dwight Diehl
*Assistant Examiner*—Ryan Massey
*Attorney, Agent, or Firm*—Toren, McGeady & Associates

[57] ABSTRACT

The invention relates to a drive hub for six speeds, with an integral back-pedal brake device (28, 31) for bicycles or the like. The gear system comprises two separate planetary gear units (5b, 6a, 7b and 16, 26, 27 respectively), each of which comprises one stage and of which a primary gear unit (5b, 6a, 7b) is incorporated in the drive member (5), while a secondary gear unit (16, 26, 27) is disposed in the hub sleeve (1). The coupling elements (2, 3, 23 29) of the drive hub are constructed in such a manner that lost motion positions are avoided both during driving and during braking. During braking the torque flow is always guided through the secondary gear unit (16, 26, 27) in the hill speed position by means of separate detents (23) which come into operation only during the backward rotation of the drive member (5), so that the back-pedal brake is operated with a stepped-up brake force.

17 Claims, 5 Drawing Sheets

MULTISPEED DRIVE HUB WITH MORE THAN THREE SPEEDS

BACKGROUND OF THE INVENTION

The invention relates to a multispeed drive hub with more than three speeds for a bicycle.

A five-speed drive hub for a bicycle, having an integral back pedal brake device, is known from DE-A-34 40 071. The drive hub comprises a hub sleeve mounted for rotation on a hub axle and adapted to be driven, via a multistage planetary gear unit, by a drive member rotatable on the hub axle relative to the hub axle and the hub sleeve. The entire planetary gear unit is accommodated in the hub sleeve and has planet wheels in the form of step wheels whose steps are adapted to be alternately coupled, with the aid of a manually operated control device, to two sun wheels, which in turn can be alternately fastened for rotation with the hub axle. In the known drive hub the cost of manufacture, assembly and adjustment of the two-stage planetary gear unit is comparatively high. Moreover, in its overdrive positions the planetary gear unit reduces the achievable braking moment of the back-pedal brake device.

The problem underlying the invention is that of providing a multispeed hub which has more than three speeds and an integral back-pedal device and which entails the least possible expense for constructional parts while achieving an improved braking action. In particular, with low costs for constructional parts, it should be ensured that the brake can be applied with an increased back-pedal braking moment irrespective of the instantaneous control position of the drive hub. The invention also seeks to reduce the cost of assembling the drive hub.

SUMMARY OF THE INVENTION

Within the scope of the invention two preferably only single-stage planetary gear stages are provided, of which a first is combined to form a unit with a drive hub drive member rotatable on a hub axle, while the second gear stage is accommodated in the hub sleeve. This method of arrangement enables a compact construction to be achieved. The back-pedal brake device is operated from the planet wheel carrier of the second gear stage. The ring gear of the second gear stage is adapted to be coupled direct to the drive member by a controllable detent arrangement. The detents of this controllable detent arrangement lock in the back-pedalling direction of rotation of the drive member and are freed for engagement by means of inclined push surfaces when the back-pedalling rotation of the drive member occurs. In this way the effect is achieved that independently of the torque transmission paths in the individual speeds of the drive hub the detent arrangement can free the brake movement path during the back-pedal movement by means of the step-down second gear stage and, independently of the speed engaged at the moment, braking is possible in a step-down speed.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figures 1, 2, 3:
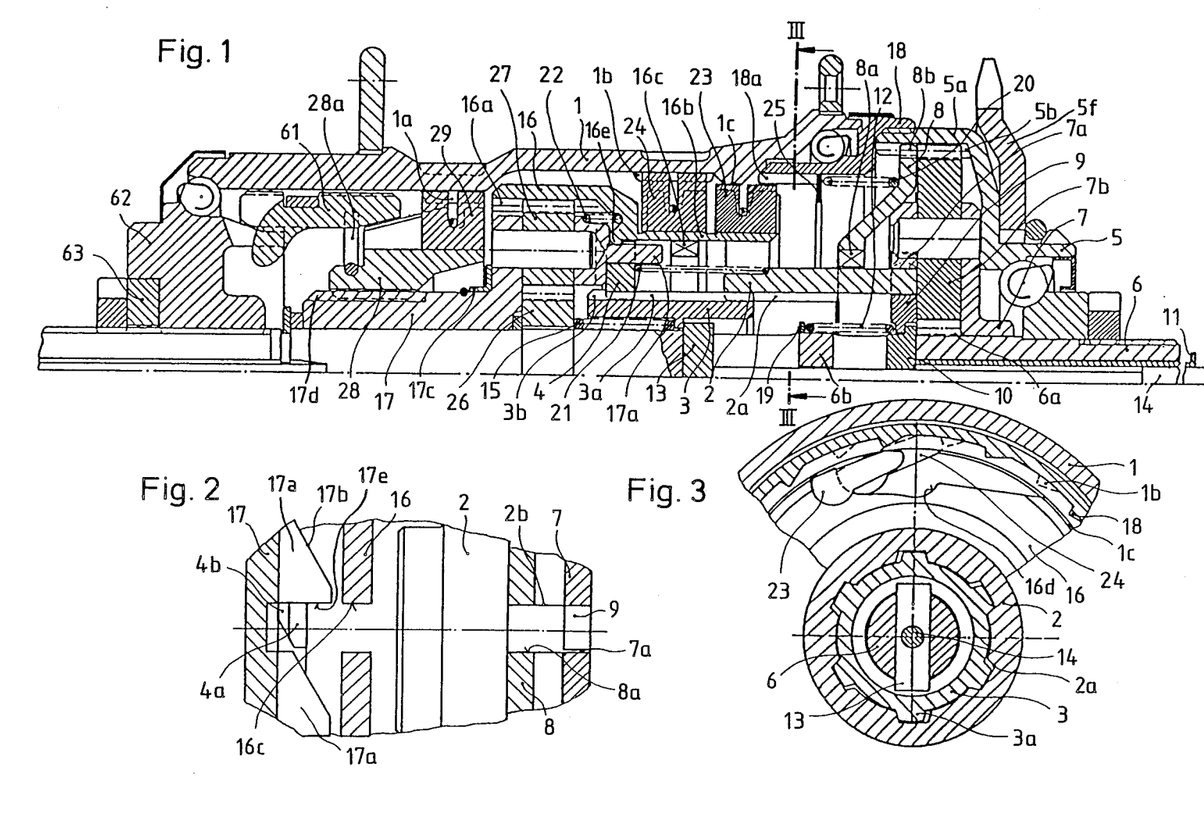
FIG. 1 is a longitudinal section of a form of construction of a six-speed drive hub, provided with a back pedal brake, in the fifth-speed running position.
FIG. 2 is a radial plan view, partly in section, of a detail of the drive hub shown in FIG. 1.
FIG. 3 is a sectional view, taken on the line III—III in FIG. 1, of the drive hub shown in FIG. 1.

In the example of construction shown in FIG. 1 of a six-speed drive hub with integral back-pedal brake device, according to the invention, 1 designates a hub sleeve, which is provided with spoke flanges and which is mounted for rotation relative to a hub axle 6 and can be driven by a drive member 5, which in turn is rotatable relative to the hub axle 6 and to the hub sleeve 1, with the aid of a planetary gear arrangement consisting of two planetary gear stages. 2 designates a coupling sleeve which is coaxial to the hub axle 6 and which is axially stressed by a compression spring 21 and, by means of inner coupling claws 2a, is permanently connected to a coaxial coupling sleeve 3 provided with outer coupling claws 3a. This coupling sleeve 3 is continuously stressed by a compression spring 15 and by means of a sliding block 13 is manually controllable to move axially on the hub axle 6. By means of the coupling claws 3a the coupling sleeve carries non-rotatably a coaxial discshaped driver 4, whose radial arms 4a in turn act as end supports for the compression spring 21 acting on the coupling sleeve 1 and are held axially by the spring force against radial projections or shoulders 3b on the coupling sleeve 3. The coupling position variants of the driver 4 will be explained later on.

The abovementioned coupling sleeve 2 is provided with slots 2b which, referring to FIG. 1, are disposed axially on the right-hand side and through which radial arms of a driver 9, which is in the form of a control star, extend radially, as can be seen in FIG. 2. The driver 9 itself is stressed by a compression spring 12, which is supported against a retaining ring 19 on the hub axle 6 and is adapted to be axially moved manually with the aid of another sliding block 10. The sliding block 10 can be controlled by means of a control sleeve 11, which is guided in an axial bore in the hub axle 6 and surrounds a control pin 14 serving to control the previously mentioned sliding block 13.

In the control position shown in FIG. 1 (fifth speed) of the hub a coupling connection exists between the driver 9, or its radial arms, and a planet wheel carrier 7 of a primary gear unit, the carrier 7 being mounted for rotation on the hub axle 6. The primary gear unit has planet wheels 7b which mesh on the one hand with a sun wheel 6a fastened on the hub axle 6 and on the other hand with a ring gear or annulus 5a, which is provided with internal toothing 5b and which is part of a drive member 5, as shown in FIG. 1. An approximately pot-shaped disc part 8 coaxial to the hub axle 6 is disposed axially at the side of the planet wheels 7b, remote from the drive member 5, and meshes on the one hand, by means of an external toothing 8b, with the toothing 5b of the ring gear 5a of the drive member 5 and on the other hand, at its centre, is provided with a coupling toothing 8a adapted to cooperate with radial coupling elements or coupling arms of the driver 9 when the latter is moved, against the action of the compression spring 12 fastened on the hub axle 6, to the left out of the position shown in FIG. 1.

The pot-shaped coupling part 8 (ring gear disc) is in turn movable axially on the coupling sleeve 2 against the action of a compression spring 20, whose support is formed by an abutment disc 25 of a bearing part 18. This bearing part 18 is fastened by means of a screw connection to the ring gear part 5a of the drive member 5, and at the same time forms a bearing for the hub sleeve 1 on the axially right-hand side of the latter. Moreover, this bearing part 18 is provided with internal ratchet toothing 18a, the function of which will be explained more fully later on.

The previously mentioned driver 4 on the coupling sleeve 3 is in coupling connection, by means of its radial arms 4a, with axial projections 17a of a planet wheel carrier 17 of a second planetary gear unit (secondary gear unit). This planet wheel carrier 17 has a set of planet wheels 27, which are mounted on pins and are in permanent mesh with a sun wheel 26 fastened on the hub axle 6. The pins are in turn held axially by a ring 17c. The ring gear (annulus) 16 meshing with the planet wheels 27 has an axially long internal toothing 16a and is axially movable, against the action of a compression spring 22, relative to the planet wheel carrier 17 or the planet wheels 27, as will be explained more fully later on. On an axial extension 16b of the ring gear 16 is disposed a set of detents 24 capable of limited movement in the peripheral direction in their bearing pockets 16d, while another set of detents 23 is disposed axially at the side thereof, both sets pointing in the same engagement direction, as can be seen in particular in FIG. 3. In the control position shown in FIG. 1 the detents 24 are held in engagement with an internal toothing 1b of the hub sleeve 1, while the detents 23 are held, by means of a control edge 1c of the hub sleeve 1, out of engagement with the internal toothing 18a. On axial displacement of the ring gear 16 (to the right in FIG. 1), the detents 24 can be disconnected at the control edge 1c and the detents 23 can then come into engagement with the internal toothing 18a of the bearing part 18, the toothing 18a then lying radially opposite them, as will be further explained. The ring gear extension 16b carrying the detents 23 and 24 is provided with internal coupling surfaces 16c, which in a manner still to be described permit a coupling connection to the radial arms 4a of the previously mentioned driver 4 on the coupling sleeve 3.

In the control position shown in FIG. 1 the radial arms 4a of the driver 4 are coupled to axial coupling projections 17a on the planet wheel carrier 17. In this position of the driver 4 the arms 4a of the driver 4, which is stressed by the compression spring 21, hold the ring gear 16 axially fast against an inner shoulder 16e on the ring gear 16, against the action of a compression spring 22 which at its other end is supported against the axially fixed planet carrier 17, as can be seen in FIG. 1. The planet wheel carrier 17 is mounted axially fast on the hub axle 6 and, in conventional manner, carries on a steep screwthread 17d on its bearing stem a brake cone 28 which is acted on by a friction spring 28a and which in turn carries a set of detents 29 permanently in engagement with an internal ratchet toothing 1a on the hub sleeve 1. By means of the brake cone 28 a brake shell 61, which is held non-rotatable on a bearing cone 62 mounting the hub sleeve 1, can be expanded in order to brake the hub sleeve 1. The bearing cone 62 is in turn supported in the usual manner against a reaction moment support lever 63.

The abovedescribed drive hub has six selectively engageable speeds. FIG. 1 shows the drive hub in the fifth speed control position (low overdrive). The torque flow then passes from the sprocket wheel 5f to the drive member 5, to the ring gear 5a, and thus via the internal toothing 5b to the planet wheels 7b, which are in mesh with the sun wheel 6a on the hub axle 6. The planet wheel carrier 7 transmits the torque with reduced speed through the coupling surfaces 7a to the radial arms of the driver 9, these arms extending through the slots 2b in the coupling sleeve 2. The coupling sleeve 2 transmits the torque to the coupling sleeve 3, from which the torque flow continues via the driver 4 and its arms 4a to the axial extensions 17a of the planet wheel carrier 17 (see FIG. 2). The planet wheels 27 of the planet wheel carrier 17 turn on the sun wheel 26 and drive the ring gear 16, while the detents 24 on the extension 16b of the ring gear 16 drive the hub sleeve 1, via the internal toothing 1b, in the fifth speed (see also FIG. 3). The detents 29 are at the same time overtaken by the internal toothing 1a, while the control edge 1c holds the detents 23 out of the internal toothing 18a.

For the purpose of engaging the sixth speed (high overdrive), only the primary gear unit is changed over by means of the sliding block 10 with the aid of the control sleeve 11 and of a control device (not shown here). For this purpose the driver 9 is moved axially to the left against the action of the compression spring 12 until it bears against a web 6b in a slot in the hub axle 6. The coupling connection to the planet wheel carrier 7 is released, and instead the driver 9 is coupled to the ring gear disc 8, which is adapted to yield axially to the left against the action of the spring 20 in order to facilitate the coupling engagement. The torque flow now passes from the drive means 5 via the ring gear 5a, without any change of the speed of rotation, directly to the ring gear disc 8, whose radially inner coupling surfaces 8a drive the driver 9 and thus the coupling sleeve 2. The further torque flow in the secondary gear unit is then the same as far as the hub sleeve 1 as in the case of the fifth speed control position already described.

For the engagement of the fourth speed (high normal speed), in a control position of the primary gear unit which is unchanged in comparison with the sixth speed, the sliding block 13 is released to a middle position by the control pin 14 manually controlled by the control device, so that the control sleeve 3, previously retained axially, accordingly follows the sliding block 13 through the action of the stressed compression spring 15. The driver 4 is moved by the control sleeve 3 to the same extent axially to the right against the compression spring 21, while the ring gear 16, acted on by the compression spring 22 and held axially by the driver 4 or its arms 4a, is moved correspondingly. The detents 24 disposed on the ring gear extension 16b are thereby pushed under the control edge 1c of the hub sleeve 1 and brought out of engagement. The control stroke of the control block 13 is for this purpose so adjusted that the detents 23 continue to be disengaged. The torque flow now passes from the planet wheel carrier 17, with the ring gear detents 24 disengaged, to the brake cone 28 and thus to the detent set 29, which thus drives the hub sleeve 1 in the fourth speed (high normal speed) through the internal toothing 1a.

For the engagement of the third speed (low normal speed) the sliding block 10, and therefore the driver 9 stressed by the compression spring 12, are simply released further axially to the right with the aid of the control sleeve 11 and of the control device. The primary gear unit is thus re-engaged. The torque flow then passes, with a speed of rotation lowered by the transmission factor of the primary gear unit, through the secondary gear unit, which is unchanged in relation to the fourth speed. The hub sleeve 1 is thus driven in the third speed.

For the engagement of the second speed (low hill speed) the primary gear unit is changed over, by means of the control device and the control sleeve 11, the sliding block 10 and the driver 9, to a position in which the ring gear disc 8 bypasses the primary gear unit, so that the torque is transmitted from the drive member 5 without reduction of speed of rotation, to the coupling sleeve 2 and thus to the coupling sleeve 3 and to the driver 4. By means of the control device the sliding block 13 has also been controlled by the control pin 14, simultaneously with the sliding block 10, in such a manner that the control pin 14 or the sliding block 13 is further slackened to the right through the action of the compression spring 15 acting on the coupling sleeve 3 and thus on the sliding block 13. Together with the coupling sleeve 3, the driver 4 is also similarly moved against the compression spring 21, whereby the ring gear 16 is also freed for further axial movement to the right through the action of the compression spring 22. The ring gear 16 thus comes to lie with its extension part 16b, axially from the left, against the disc 25 in the hub sleeve 1, and the detents 23 are freed from the control edge 1c, thus then coming into engagement with the internal toothing 18a of the bearing part 18, which is separated from the hub sleeve 1 and rotates only with the drive member 5. With said member 5 driven in the driving or forward direction of rotation, the internal toothing 18a overtakes the detents 23, while the detents 24 are disengaged. On the previously mentioned axial displacement of the coupling sleeve 3, and hence of the driver 4, the arms 4a of the latter are uncoupled from the axial extensions 17a of the axially fixed planet carrier 17, and then come into engagement with the radial coupling surfaces 16c in the ring gear extension 16b. The torque flow then passes, without stepping down by the primary gear unit, from the drive member 5, the ring gear disc 8, the coupling sleeve 2, and the coupling sleeve 3 to the driver 4, whose arms 4a now drive the ring gear 16. Through its internal toothing 16a the latter drives the planet wheels 27 turning on the sun wheel 26, so that the planet wheel carrier 17, and thus also the brake cone 28, are driven by the detents 29, the latter being permanently in engagement with the internal ratchet toothing 1a of the hub sleeve 1. The hub sleeve 1 is then driven, with a correspondingly reduced speed of rotation, in the second speed (low hill speed).

For the engagement of the first speed (high hill speed) the control of the secondary gear unit is left unchanged in comparison with the second speed. With the aid of the control device the primary gear unit is simply switched over, and thus engaged, by means of the control sleeve 11 in the manner previously described. The torque flow then passes from the drive member 5, with a speed of rotation reduced in accordance with the primary gear unit, through the coupling sleeve 2 to the secondary gear unit, the control of which is unchanged in relation to the second speed, and from said gear unit to the hub sleeve 1, which is driven in the first speed (high hill speed).

In the event of a possible offset of the claws, in the abovementioned control operations it is advantageous, in the interest of reliable engagement of the coupling elements, for the driver 4 on the coupling sleeve 3 first to remain behind, relative to the coupling sleeve 3, on an axial displacement to the left, while stressing the spring 21, until engagement of the driver arms 4a with the axial coupling elements 17a on the planet carrier 17 is possible. In this way the gear speeds can be controlled without obstruction by the offset of the claws of the coupling elements which are to be coupled together. The same also applies to the coupling engagement of the ring gear disc 8 which, as already described, is axially movable against the action of the compression spring 20 and in this way can at first yield relative to the arms of the driver 9, when claw offset exists, until coupling engagement is possible.

For the initiation of the braking operation of the integral back-pedal brake in the abovedescribed six-speed drive hub illustrated in FIGS. 1 to 3, the drive member 5 is turned backwards in known manner. Brake torque is thus transmitted, optionally with reduction by the primary gear unit, through the coupling sleeve 2 and the coupling sleeve 3. The driver disc 4 engages by means of its arms 4a both in the fifth and in the sixth speed, as well as in the third and fourth speeds, between the axial coupling elements or extensions 17a of the planet wheel carrier 17 which are shown in FIG. 2, the arms 4a lying against the coupling surfaces 17e of the extensions 17a during the forward rotation of the drive member 5. On the backward rotary movement of the drive member 5 the arms 4a are moved axially to the right (see FIG. 2), through their inclined surfaces 4b, by inclined surfaces 17b on the axial coupling elements 17a of the planet wheel carrier 17, while the compression spring 21 is further stressed by the driver 4. Because of the axial movement of the driver 4, the ring gear 16 can also move axially to the right, stressing the spring 22, until on the one hand the detents 24, which were previously operative in the fifth or sixth speed, are disengaged at the control edge 1c and the detents 23 (see FIG. 3), which were previously disengaged in those speeds, now come into engagement with the internal toothing 18a on the bearing part 18. During braking in the third or fourth speed the ring gear 16 is initially in a position in which the detents 24 are already disengaged but the detents 23 are still disengaged. The ring gear 16 is further moved during braking in the third or fourth speed, through the backward rotation of the drive member 5, until the detents 23 are freed. The backward rotation of the drive member 5 is transmitted from the ring gear 5a through the detents 23 (brake detents), which lock in this direction of rotation, to the ring gear 16. The latter drives the planet wheel carrier 17 through the planet wheels 27. Braking of the hub sleeve 1 is thus effected in known manner through the brake shell 31.

During braking in the first or second speed the ring gear 16 has already been moved to its position axially on the right, so that the brake detents 23 are already in engagement. Braking is effected as in the case of the third to sixth speeds already described. The reliabiliity of the braking operation described above is improved by the fact that the arms of the driver 9 are also in engagement on the primary gear unit side (FIG. 2) during braking.

As can be seen from the above description of the braking operations, in the multispeed hub constructed in accordance with the invention braking is always effected, irrespective of the gear ratio engaged in each particular case, with the brake power intensifying action of the secondary gear unit in the hill climbing control position.

Figure 4:
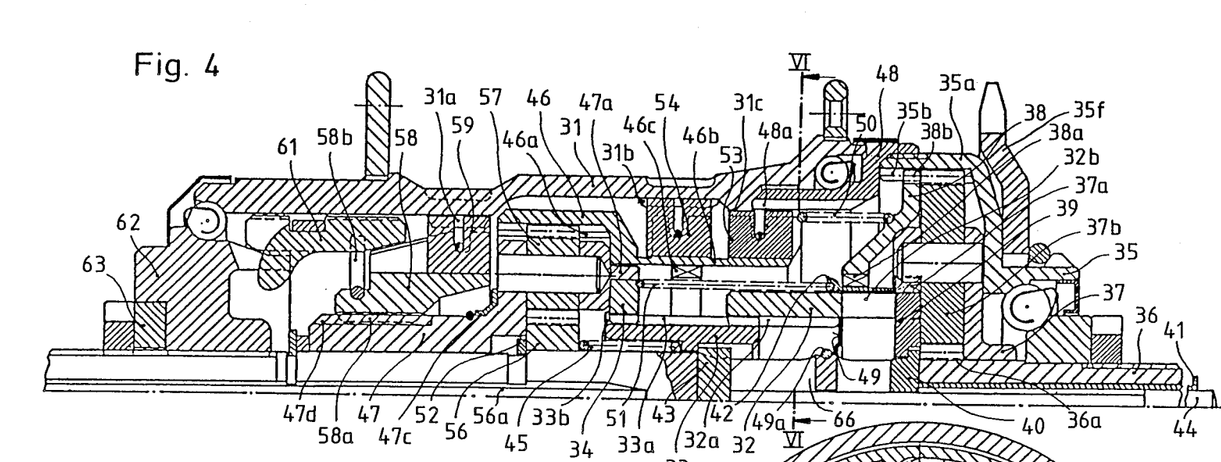
FIG. 4 is a longitudinal section of another form of construction of a six-speed drive hub, provided with a back-pedal brake, in the fifth-speed running position.
Figure 5:
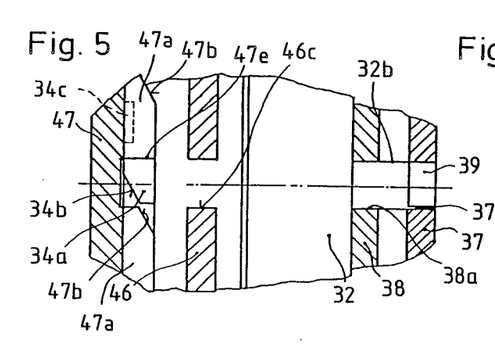
FIG. 5 is a radial plan view, partly in section, of a detail of the drive hub shown in FIG. 4.
Figure 6:
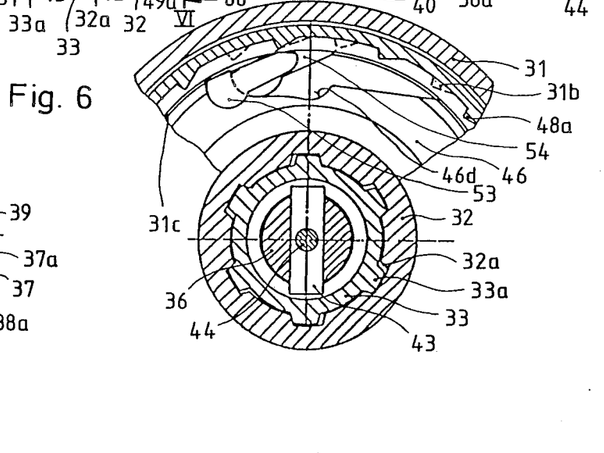
FIG. 6 is a sectional view, taken on the line VI—VI in FIG. 4, of the drive hub shown in FIG. 4.

FIGS. 4 to 6 illustrate another example of construction of a six-speed drive hub with integral back-pedal brake. In comparison with the example of embodiment illustrated in FIGS. 1 to 3, the reference numerals for corresponding parts of the multi-speed hub according to the invention have been increased by the numerical value 30. In explanation, reference is made to the description given in connection with FIGS. 1 to 3.

The drive hub shown in FIGS. 4 to 6 is provided with a hub sleeve 31 having spoke flanges. The appertaining drive member 35, which is equipped with a sprocket wheel 35f, is here again connected to a ring gear 35a, with whose internal toothing 35b a set of planet wheels 37b is in mesh, their sun wheel 36a being fastened to the hub axle 36. The planet wheel carrier 37 in this single-stage primary gear unit is axially fixed but mounted for rotation on the hub axle 36 and is provided, remote from the ring gear 35a, with a system of coupling surfaces 37a adapted to cooperate with coupling claws of a driver 39, as will be described later on. Axially next to the planet wheel carrier 37 is disposed, concentrically, an approximately dish-shaped ring gear disc 38, which is axially stressed by a compression spring 50 and is in permanent mesh, by means of its external toothing 38b, with the ring gear toothing 35b, while at its centre it is provided with coupling surfaces 38a adapted to cooperate with the previously mentioned driver 39. The ring gear disc 38 encloses, at its centre, a coaxial coupling sleeve 32, which is held axially on the hub axle 36 by means of a washer 49, which is concentric to the hub axle 36, and of a retainer ring 49a.

The coupling sleeve 32, which can be coupled by means of the driver 39 in a manner still to be described, is permanently in coupling connection with a coaxial coupling sleeve 33, whose coupling claws 33a are surrounded by coupling grooves 32a in the coupling sleeve 32, as can be seen in particular in FIG. 6. The coupling sleeve 33 is mounted for axial movement on the hub axle 36 and is axially stressed by a compression spring 45. Against the action of the latter the coupling sleeve 33 is held by means of a sliding block 43, which is received in an aperture 66 in the hub axle 36 and which is manually controllable by a control device (not shown here) with the aid of a control rod 44 received concentrically in the hub axle 36. A disc-shaped driver 34 is mounted coaxially, and fixed in respect of rotation, on the coupling sleeve 33 with the aid of coupling claws 33a. The driver 34 is axially movable relative to the coupling sleeve 33 against the action of a compression spring 51, and in the position illustrated lies against a shoulder 33b on the coupling sleeve 33, as can be seen in particular in FIG. 4. The driver 34 has radial arms 34a which are adapted to be coupled to axial coupling extensions 47a of a planet wheel carrier 47 of a single-stage planetary gear unit (secondary gear unit) (FIG. 5).

The planet wheel carrier 47 is mounted for axial movement on the hub axle 36. The appertaining planet wheels 57 are mounted on pins, which in turn are axially secured by means of a ring 47c and a circlip. The planet wheels 57 are permanently in mesh with a sun wheel 56, which is mounted on the hub axle 36 by means of coupling beaks or ribs 56a in such a manner as to be non-rotatable relative thereto but to be axially movable against the force of the previously mentioned compression spring 45. The ring gear (annulus) 46 associated with the planet wheels 57 is provided with an axially long internal toothing 46a and with an extension 46b which serves for the non-rotatable mounting of a set of detents 54 and—axially at the side thereof—of another set of detents 53 (brake detents). As can be seen in FIG. 6, the detents 53 and 54 are disposed in the same engagement direction; in addition, it can be seen that the detents 54 are mounted in their bearing pockets 46d for limited movement in the peripheral direction of the detent carrier.

In the control position (fifth speed) of the drive hub shown in FIG. 4 the detents 54 are in engagement with an internal toothing 31b, while the detents 53 are held by a control edge 31c on the hub sleeve 31 out of engagement with an internal toothing 48a provided in a coaxial bearing part 48, which in turn is non-rotatably joined to the ring gear 35a and serves as a bearing part for the hub sleeve 31 on the side of the latter situated axially to the right. The ring gear 46 is as a whole axially stressed by the compression spring 50, which on the other side is supported against the previously mentioned ring gear disc 38.

The previously mentioned back-pedal brake device is of conventional construction and comprises a brake cone 58 axially movable on a bearing stem of the planet wheel carrier 47 and which by means of a coacting threaded portion 58a is screwed on a steep screwthread 47d on the bearing stem. The brake cone 58 is acted on by a friction spring 58b and carries a set of detents 59 which engages in an internal toothing 31a on the hub sleeve 31. The appertaining brake shell 61 can be expanded by the brake cone 58, when the latter moves axially to the left, on a brake cone 62 held by means of a reaction moment support lever 63, in order to brake the hub sleeve 31.

The abovedescribed example of construction of a six-speed hub with integral back-pedal brake device is shown in the fifth speed control position (low overdrive) in FIG. 4. It operates as follows:

The torque introduced through the drive member 35 is transmitted through the primary gear unit and from the latter, by means of the driver 39, to the coupling sleeve 32. From the coupling sleeve 32 the torque flow passes by way of the coupling sleeve 33 to the driver 34 and the arms 34a of the latter. As can be seen in particular in FIG. 5, the driver arms 34a lie against coupling surfaces 47e of axial coupling elements or extensions 47a of the axially juxtaposed planet wheel carrier 47, the torque being transmitted from said carrier to the planet wheels 57 and from the latter to the ring gear 46. The detents 54 disposed on the ring gear extension 46b drive the hub sleeve 31 via the internal toothing 31b in the fifth speed (low overdrive).

For the engagement of the sixth speed (high overdrive), with the secondary gear unit in an unchanged control position, that is to say a position corresponding to the fifth speed, the sliding block 40 and thus also the driver 39 are simply moved axially to the left with the aid of the control sleeve 41. The arms of said driver, which pass through slots 32b provided in the coupling sleeve 32, are pushed out of their connection, which can be seen in FIG. 5, to the coupling surfaces 37a of the planet carrier 37 of the primary gear unit and brought into connection with the coupling surfaces 38a of the ring gear disc 38. At the same time a control sleeve 42 (FIG. 4) is moved axially on the coupling sleeve 32 by the ends of the arms of the driver 39, against the force of the compression spring 51. The torque flow then passes, with a speed of rotation increased by the transmission factor of the primary gear unit, through the drive path already described for the fifth speed arrangement, to the hub sleeve 31. In the fifth and sixth speeds the detents 59 are overtaken by the internal toothing 58b and the detents 53 are held out of the internal toothing 48a by the control edge 1c.

For the engagement of the fourth speed (high normal speed), with the primary gear unit arrangement unchanged in comparison with the sixth speed, that is to say with the position of the driver 39 unchanged, the sliding block 43 is slackened to the right by the control device, with the aid of the control pin 44 guided coaxially in the hub axle 36, while the coupling sleeve 33 is correspondingly moved axially to the right into a middle position, stressing the compression spring 45. The driver 34 is also moved to the same extent by the extension 33b of the coupling sleeve 33, whereby the previously described coupling engagement shown in FIG. 5 is disengaged and the driver 34 is instead brought into engagement with the radial coupling surfaces 46c, which are here again provided in the ring gear extension 46b (FIGS. 4 and 5). With the primary gear unit unchanged in comparison with the sixth speed, the torque flow then passes from the coupling sleeve 32 to the coupling sleeve and from the latter to the driver 34, whose arms 34a are coupled to the coupling surfaces 46c of the ring gear 46. The detents 54 disposed on the ring gear extension 46b transmit the torque to the internal toothing 31b of the hub sleeve 31. The detents 59 are once again overtaken by the internal toothing 31a, and the detents 53 are held out of the internal toothing 48a by the control edge 31c.

For the engagement of the third speed (low normal speed), with the control position of the secondary gear unit unchanged, the primary gear unit is simply switched over by the control device with the aid of the control sleeve 41, in such a manner that by means of the sliding block 40 the driver 39 is moved back, against the action of the compression spring 51 acting on the control sleeve 42, into the position visible in FIGS. 4 and 5, in which the primary gear unit is in engagement. Because of the reduction of the speed of rotation of the primary gear unit, and with the torque flow of the secondary gear unit otherwise unchanged, the hub sleeve 31 is then driven in the third speed (low normal speed).

For the engagement of the second speed (low hill speed), the primary gear unit is first disconnected by means of the control device. Through the axial movement of the sliding block 40 of the control sleeve 41, and hence of the driver 39, to the left, the ring gear disc 38 is now brought into the torque flow to the coupling sleeve 32. Secondly, the secondary gear unit is also changed over in relation to the third speed. For this purpose the sliding block 43 is still further eased off axially into a right-hand position by means of the control pin 44, while the coupling sleeve 33 is moved axially still further to the right through the action of the compression spring 45. The driver 34, moved along by the stop 33b on the coupling sleeve 33, follows the axial movement against the action of the compression spring 51. In the region of its arms 34a the driver 34 is provided with stops which cooperate with axial surfaces 34c of the coupling surfaces 46c and which then also move the ring gear 46 axially to the right against the action of the compression spring 50. The detents 54 on the ring gear extension 46b then come under the control edge 31c of the hub sleeve 31 and are disengaged. The detents 53, which were previously disengaged, are on the other hand freed for engagement with the internal toothing 48a of the bearing part 48 joined fast to the drive member ring gear 35a. The torque flow then passes from the ring gear disc 38 on the primary gear unit side through the coupling sleeve 32 to the coupling sleeve 33. The driver disc 34 connected to the coupling sleeve 33 to be non-rotatable relative thereto continues by means of its arms 34a to drive the ring gear 46 through the coupling surfaces 46c of the latter. The torque flow passes through the planet wheels 57 engaging with the ring gear 46 and turning on the sun wheel 56, to the planet wheel carrier 47 and, via the brake cone 58 guided thereon and the detents 59, to the internal toothing 31a of the hub sleeve 31.

In order to shift to the first speed (high hill speed) the secondary gear unit is left unchanged in comparison with the second speed and with the aid of the control device only the primary gear unit is re-engaged, so that the driving speed of rotation is correspondingly reduced and in this way the hub sleeve 31 is driven still more slowly by the detents 59 in the first speed.

For the initiation of the braking operation the drive member 35 is turned backwards in conventional manner. In the case of a braking operation starting from the fifth or sixth speed, the driver 34 is turned backwards with the aid of the coupling sleeve 32 and the coupling sleeve 33. Coupling engagement with the planet wheel carrier 47 having previously been made, said carrier is thus first likewise turned backwards. Since the brake cone 58, which is screwed by means of the screwthread 58a on the steep screwthread 47d of the planet wheel carrier is at first held non-rotatably relative to the hub axle 36, and is thus axially fixed, by means of the friction spring 58b, as a reaction thereto the planet wheel carrier 47 itself at first moves axially to the right, until it bears against a thrust ring 52 on the hub axle 36. During this axial movement the planet wheel carrier 47 drives the sun wheel 56, which moves towards the compression spring 45 bearing against the coupling sleeve 33. In addition, the driver 34 bearing against the planet wheel carrier 47 is driven against the action of the compression spring 51, which is supported on the control sleeve 42, and the ring gear 46 is driven, against the action of the compression spring 50, with the detents 54 and 53. On the axial movement of the ring gear 46 the detents 54, which were previously in engagement, are disengaged at the control edge 31c and, instead, the detents 53, which were previously disengaged, are freed for engagement with the internal toothing 48a of the bearing part 48.

As a result, the backward rotation of said bearing part, brought about by the drive member 35, is now transmitted through the detents 53 to the ring gear 46, and thus via the planet wheels 57, which turn on the sun wheel 56, to the planet wheel carrier 47. The sun wheel 56 is in turn permanently mounted for rotation with the hub axle 36, even when axial movement takes place, with the aid of coupling means in the form of beaks or ribs 46a, so that the planet wheel carrier 47 now transmits the backward movement, with a reduced speed of rotation but with correspondingly increased torque, through the screwthreads 47d and 58a to the brake cone 58, which previously had been held axially fast and which by an axial movement to the left now expands the brake shell 61 in known manner for the purpose of braking the hub sleeve 31.

Figure 7:
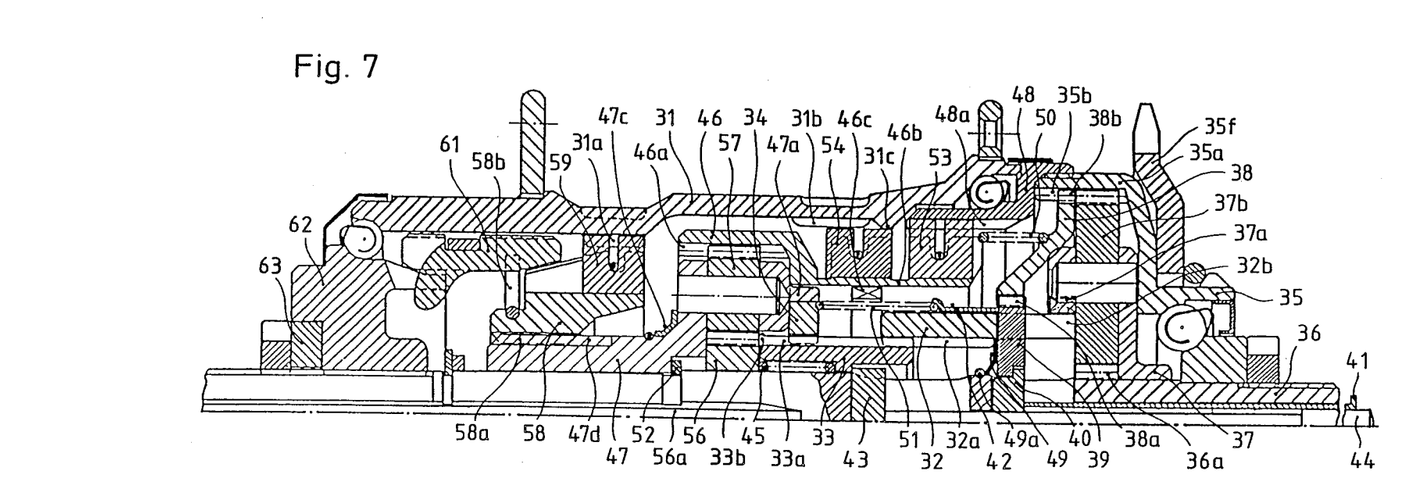
FIG. 7 is a longitudinal section, in the braking position, of the drive hub shown in FIG. 4.
Figure 8:
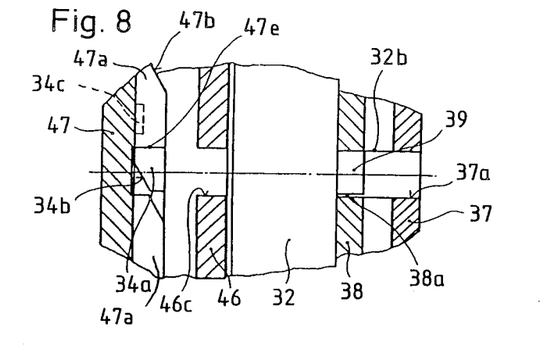
FIG. 8 is a radial plan view, partly in section, of a detail of the drive hub shown in FIG. 7.

FIGS. 7 and 8 show the six-speed drive hub of FIGS. 4 to 6 in the back-pedal brake position starting from the sixth speed. The planet wheel carrier 47, which together with the sun wheel 56 has been moved axially to the right, and also the ring gear 46, which has also been moved axially to the right, together with the brake detents 53, which are now the only detents in engagement, can thus be seen. It can also be seen that the driver 34 has been separately moved axially on the coupling sleeve 33 against the action of the compression spring 51, while the coupling sleeve 33, pressed against the sliding block 43 by the compression spring 45, has not changed its axial position.

The abovedescribed coupling position of the secondary gear unit, shown in FIGS. 7 and 8, is also obtained in the fifth speed. The only difference is that instead of the ring gear disc 38 the planet wheel carrier claws 37a are now coupled to the coupling sleeve 32 by means of the driver 39. The braking operation is carried out in the manner explained for a braking operation starting from the sixth speed.

The bevels 47b, visible in FIGS. 5 and 8, on the coupling elements 47a of the planet wheel carrier 47 and the bevels 34b on the arms 34a of the driver ensure that the movement will take place without obstruction and facilitate coupling.

In a braking operation starting from the fourth or third speed, on the commencement of which the driver 34 and the coupling sleeve 33 have been moved axially to the right, the same axial movement operations occur as in the case of the previously described sixth and fifth speeds. On the forward rotation of the drive member 5 the ring gear 46 retains the axial position visible in FIG. 4 in the case of the fourth and third speeds because of the action of the compression spring 50, as described above, and is moved axially to the right only during the braking operation itself, so that the brake detents 53 can then come into engagement.

In the case of a braking operation starting from one of the hill speeds, that is to say the second or first speed, for the initiation of which operation the ring gear 46 has already been moved axially to the right-hand end position by means of the control device, so that the detents 53 are already in engagement with the internal toothing 48a, only the planet wheel carrier 47 and the sun wheel 56 are moved axially to the right on commencement of the braking operation. However, in each of the speed control positions the position of the primary gear unit at the time in question has no effect on the braking operation, and braking is effected in the hill speed position of the secondary gear unit.

Figure 9:
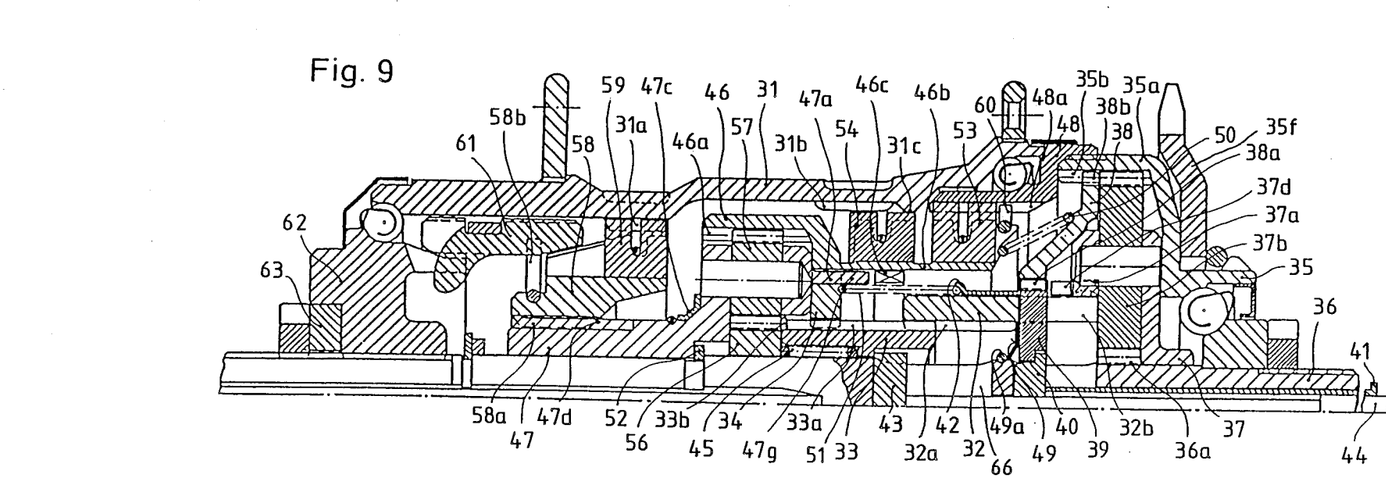
FIG. 9 is a longitudinal section of a variant, shown in the braking position, of the drive hub shown in FIG. 4.
Figure 10:
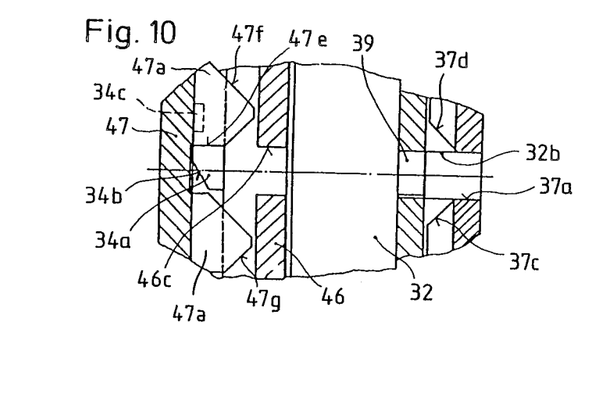
FIG. 10 is a radial plan view, partly in section, of a detail of the drive hub shown in FIG. 9.

FIGS. 9 and 10 illustrate a variant of the six-speed drive hub shown in FIGS. 4 to 8. In FIG. 9 this variant of the six-speed drive hub shown in FIG. 7 is shown in the control position for braking from the sixth speed. While the construction is otherwise the same as in the case of FIGS. 4 to 8, the drive hub shown in FIG. 9 contains a friction spring 60 which is supported on the internal toothing 48a and which acts on the ring gear extension 46b provided with detents 54 and 53. The friction spring 60 increases in a simple manner the resistance necessary for operating the brake for reliable brake operation.

As can best be seen in FIG. 10, the drive hub shown in FIG. 9 is provided with additional deflector bevels 37c and 37d on the coupling claws 37a of the planet wheel carrier 37 of the primary gear unit. In addition, roof-shaped deflector bevels 47f and 47g respectively are provided on the end faces of the axial coupling claws 47a of the planet wheel carrier 47 of the secondary gear unit, for the purpose of cooperating with the arms 34a of the driver 34. The deflector bevels 47f and 47g are disposed axially in front of the stop surfaces 47e of the claws 47a.

The engagement of the coupling claws is facilitated by these measures. In particular, lost motion between the coupling claws when a gear change is made is avoided. It is obvious that the deflector bevels on the coupling claws of the primary and secondary gear units can also be adopted in other forms of construction of the multispeed drive hubs, particularly the variant shown in FIGS. 1 to 3.

Figure 11:
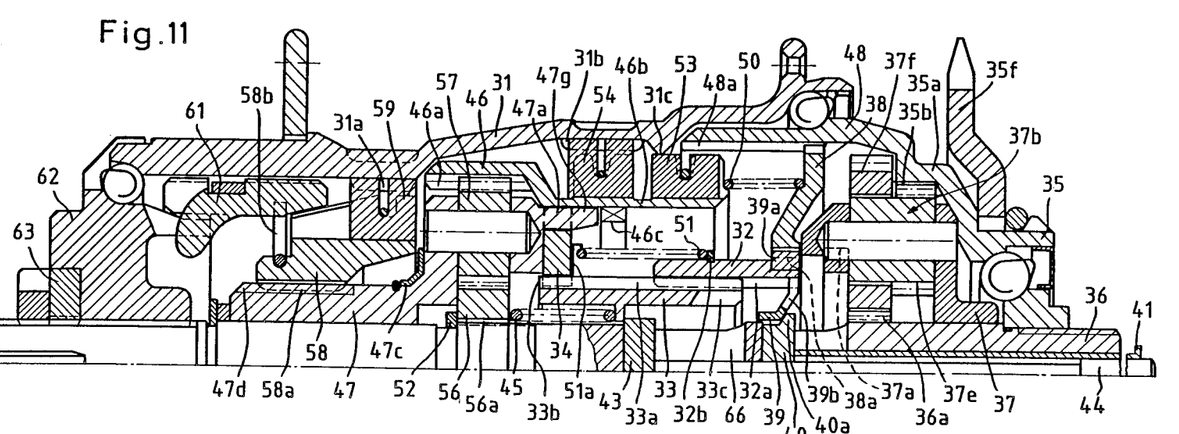
FIG. 11 is a longitudinal section of another variant, shown in the sixth-speed running position, of the six-speed drive hub shown in FIG. 4.
Figure 12:
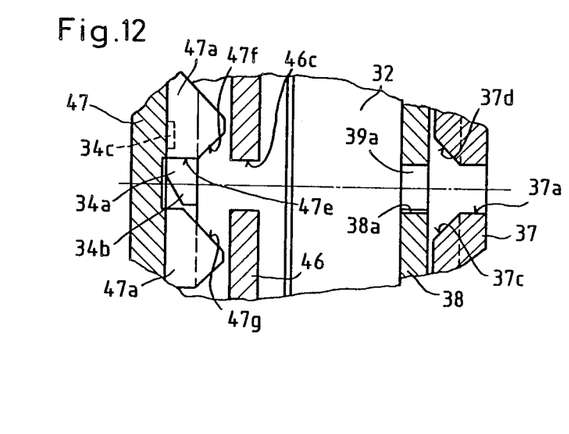
FIG. 12 is a radial plan view, partly in section, of a detail of the drive hub shown in FIG. 11.

FIGS. 11 and 12 show another variant of the six-speed drive hub shown in FIGS. 9 and 10 and thus of that shown in FIGS. 4 to 8. In FIGS. 11 and 12 the same reference numerals are used as in FIGS. 4 to 10. For further explanation reference is made to the description relating to those figures.

FIGS. 11 and 12 show the six-speed drive hub in the sixth speed and, similarly to FIG. 4, with the drive member 35 turning in the forward direction. In contrast to FIGS. 4 to 10 the drive member 35 is integrally joined to the bearing part 48 carrying the hub sleeve 31. The primary gear unit comprises planet wheels 37b which are in the form of step wheels and of which the wheels 37e of smaller diameter, which are axially remote from the secondary gear unit, mesh with the ring gear 35a formed by the drive member 35, while the wheels 37f of larger diameter, which are axially close to the secondary gear unit, mesh with the sun wheel 36a mounted for rotation with the hub axle 36. The construction of the planet wheels 37b in the form of step wheels not only permits more favourable stepping down in the primary gear unit, but also enables the toothing 48a to be formed integrally on the drive member 35, while the diameter of the ring gear toothing 35b can be kept comparatively small.

The coupling sleeve 32 is guided on the coupling sleeve 33 for axial movement relative to the latter and is loaded by the spring 51 in the direction of the primary gear unit. The spring 51 is supported on one side against a guide plate 51a and on the other side against a retaining ring 32b of the coupling sleeve 32. At its end near the primary gear unit the coupling sleeve 32 carries a driver ring 39a, which by means of radial arms is adapted to be coupled either to the coupling surfaces 38a of the ring gear disc 38 or to coupling surfaces 37a of the planet wheel carrier 37 of the primary gear unit. The coupling position of the coupling sleeve 32 is determined by the driver 39 which is fastened at the primary gear unit end of the coupling sleeve 32 and is pressed by the spring 51 against a shoulder 40a on the sliding block 40. In FIG. 11 the primary gear unit is shown disengaged, the torque flow passing from the drive member 35 via the ring gear disc 38 direct to the coupling sleeve 32. For the engagement of the primary gear unit the sliding block 40, which is acted on by the spring 51, is eased off to the right, whereby the arms of the driver 39a are ucoupled from the ring gear disc 38a and coupled to the coupling surfaces 37a of the planet wheel carrier 37 of the primary gear unit. The abovedescribed construction of the axially movable coupling sleeve 32 provides the advantage of more favourable coupling and installation conditions. At its primary gear unit end the coupling sleeve 33 is provided with slots 33c which enable radial coupling arms 39b of the driver 39 to pass through on axially approaching the sliding blocks 40, 43. Similarly to the embodiment shown in FIGS. 9 and 10, the coupling claws of the planet wheel carrier 37 are provided with deflector bevels 37c, 37d, and the coupling claws 47a of the planet wheel carrier 47 are provided with deflector bevels 47f, 47g in order to ensure reliable coupling engagement during a gear change.

In the abovedescribed forms of construction of six-speed drive hubs according to the invention a substantial improvement of the braking action is in particular achieved through the fact that the back-pedal brake is always operated by way of the hill speed drive path, that is to say with a substantially increased brake force. The braking action is consequently the same in all gear ratios, whatever the control position at the time in question. By means of the separate detents allocated to brake operation the effect is achieved that the back-pedal drive path of the back-pedal brake can always be activated irrespective of any interruption of the forward drive path, for example during a change-over from one gear ratio to another. Reliable braking is thus also achieved even in the event of obstruction of the control device. The two-speed primary gear unit, which in the abovedescribed examples of construction of a six-speed drive hub according to FIGS. 1, 4 or 9 is combined with the drive member to form a single unit, can for example be designed with a transmission ratio $i=1:0.82-1.0$. For the three-speed secondary gear unit mounted in the hub sleeve it is for example possible to select a transmission ratio $i=1:0.68-1.0-1.47$. With these values a favourable overall transmission ratio of $1:0.56-0.68-0.82-1.0-1.21-1.47$ is obtained for the six-speed drive hub provided with a back-pedal brake device.

By dividing the planetary gear unit required for a drive hub having more than three speeds into two separate gear units, each of one stage only, a considerable simplification can be achieved. Since the primary gear unit is disposed in the drive member, outside the hub sleeve, the axial length required for the hub sleeve is scarcely greater than that of a conventional three-speed hub provided with a back-pedal brake device. The drive member has a shape similar to that of a conventional drive member, but forms a structural unit with the primary gear unit, so that the assembly of a six-speed drive hub, provided with a backpedal brake device, according to the invention is scarcely more expensive than that of a conventional three-speed hub with back-pedal brake.

The abovedescribed advantageous properties of a six-speed hub with back-pedal brake device, constructed in accordance with the invention, can be achieved with relatively low expense for parts. Thus, for example, only three compression springs are required for the embodiments illustrated in FIGS. 4 to 10.

While specific embodiments of the invention have been shown and described in detail to illustrate the application of the inventive principles, it will be understood that the invention may be embodied otherwise without departing from such principles.

What I claim is:

1. A multispeed drive hub with more than three speeds for a bicycle, comprising:
   (a) a hub axle (6; 36)
   (b) a hub sleeve (1; 31) coaxial to the hub axle (6; 36) and rotatable relative to the latter;
   (c) a drive member (5; 35) coaxial to the hub axle (6; 36) and rotatable relative to the latter and to the hub sleeve (1; 31),
   (d) a planetary gear arrangement (5b, 6a, 7b, 16, 26, 27; 35b, 36a, 37b, 46, 56, 57) with a plurality of gear stages adapted to be selectively switched into a drive path between the drive member (5; 35) and the hub sleeve (1; 31),
   (e) selectively controllable coupling devices (2, 3, 23, 29; 32, 33, 53, 59) in the drive path of the gear stages,
   (f) a back pedal brake device (28, 31; 58, 61) drivingly connected via the planetary gear arrangement (5b, 6a, 7b, 16, 26, 27; 35b, 36a, 37b, 46, 56, 57) to the drive member (5; 35) and acting on the hub sleeve (1; 31), wherein the planetary gear arrangement comprises two planetary gear stages which are adapted to be selectively coupled together by means of the coupling devices (2, 3, 23, 29; 32, 33, 53, 59) and of which a first planetary gear stage (5b, 6a, 7b; 36a, 35b, 37b) is surrounded by the drive member (5, 35) and comprises a first sun wheel (6a; 36a) mounted on the hub axle (6, 36), a first ring gear (5a; 35a) joined fast to the drive member (5; 35), at least one first planet wheel (7b; 37b) meshing with the first sun wheel (6a; 36a) and the first ring gear (5a; 35a), and a first planet wheel carrier (7; 37) coaxially rotatable relative to the hub axle (6; 36) and rotatably mounting the first planet wheel (7b; 37b), and of which a second planetary gear stage (16, 26, 27; 46, 56, 57) surrounded by the hub sleeve (1; 31) comprises a second sun wheel (26, 56) mounted on the hub axle (6; 36), a second ring gear (16; 46) coaxially surrounding the second sun wheel (26; 56), at least one second planet wheel (27; 57) meshing with the second sun wheel (26; 56) and the second ring gear (16; 46) and a second planet wheel carrier (17; 47) coaxially rotatable relative to the hub axle (6; 36) and rotatably mounting the second planet wheel (27; 57); wherein the back pedal brake device (28, 31; 58, 61) is drivingly connected to the second planet wheel carrier (17; 47); wherein the drive member (5; 35) is coupled by means of a controllable brake detent arrangement (18a, 23, 48a, 53) by at least one brake detent (23; 53) locking in the back pedal direction of rotation of the drive member (5; 35) to the second ring gear (16; 46); and wherein the brake detent arrangement (18a, 23; 48a, 53) is associated with a detent control arrangement (1c, 17b; 31c, 47d, 58a) which is drivingly connected to the drive member (5; 35) and which in the backward direction of rotation of the drive member (5; 35) frees the brake detent (23; 53) for engagement with a detent toothing (18a, 48a) associated with the brake detent (23; 53) and, in the forward direction of rotation of the drive member (5; 35) holds it out of the detent toothing (18a; 48a).

2. A multispeed drive hub according to claim 1, wherein the second ring gear (16, 46) is mounted for axial movement and carries the brake detent(s) (23; 53), while the detent toothing (18a; 48a) associated with the brake detent (23; 53) is provided on the drive member (5; 35) and wherein the detent control arrangement (1c, 17b; 31c, 47d, 58a) is provided with a control edge (1c; 31c) disposed on the hub sleeve (1; 31) and freeing the brake detent (23; 53) in dependence on the axial position of the second ring gear (16, 46) for engagement with the detent toothing (18a; 48a) or holding it out of said toothing, and is also provided with an axial push surface arrangement (17b; 47d, 58a) connected for rotational driving to the second planetary gear stage (16, 26, 27; 46, 56, 57) and acting on the second ring gear (16; 46).

3. A multispeed drive hub according to claim 2, wherein the second planet wheel carrier (17) is axially fixed relative to the hub axle (6) and the second ring gear (16) is axially movable relative to the second planet wheel carrier (17), and wherein the axial push surface arrangement (17b) acts between the second planet wheel carrier (17) and the second ring gear (16).

4. A multispeed drive hub according to claim 2, wherein the second planet wheel carrier (47) and the second ring gear (46) are axially movable, with limited play, relative to the hub axle (36), while the back-pedal brake arrangement (58, 61) comprises a brake cone (58) frictionally braked relative to the hub axle (6) and axially guided on the second planet wheel carrier (47) by means of a screwthread (47d, 58a), relative to which brake cone the second planet wheel carrier (47) and the second ring gear (46) are axially adjustable by means of the screwthread (47d, 58a) during driving in the backward direction of rotation for the purpose of controlling the brake detent arrangement (48a, 53).

5. A multispeed drive hub according to claim 4, wherein between the second planet wheel carrier (47) and the second sun wheel (56) a stop (52) limiting the axial movement of the second planet wheel carrier (47) in the direction of the drive member (35) is provided, and wherein the second sun wheel (56) is mounted on the hub axle (36) to be non-rotatable but axially movable.

6. A multispeed drive hub according to claim 4 wherein a friction spring (60) acting between the second ring gear (46) and the drive member (35) is provided.

7. A multispeed drive hub according to claim 2, wherein the second ring gear (16; 46) carries at least one control detent (24; 54) of a control detent arrangement (1b, 24; 31b, 54) which, in the forward direction of rotation of the drive member (5; 35), couples the second ring gear (16; 46) to the hub sleeve (1; 31) for rotation with the latter, and wherein on the hub sleeve (1; 31) a control edge (1c; 31c) is provided which frees the control detent (24; 54) for engagement with an associated detent toothing (1b, 31b) only when the brake detent (23; 53) is locked against engagement.

8. A multispeed drive hub according to claim 1 wherein axially between the first planetary gear stage (5b, 6a, 7b; 35b, 36a, 37b) and the second planetary gear stage (16, 26, 27; 46, 56, 57) a coupling sleeve (2, 32) is disposed which is rotatable coaxially to the hub axle (6; 36) and which by means of a first coupling element (9; 39; 39a) guided for axial movement on the hub axle (6; 36) is adapted to be coupled alternately for rotation with the first planet wheel carrier (7b; 37b) or with the drive member (5; 35), wherein the first coupling element (9; 39; 39a) is movable by means of a first control element (10; 40) selectively movable along the hub axle (6; 36), wherein a coupling sleeve (3; 33) coaxial to the hub axle (6; 36) is coupled to the coupling sleeve (2; 32) in such a manner as to be non-rotatable but axially movable relative to said coupling sleeve (2; 32), wherein the coupling sleeve (3; 33) carries, fixed in respect of rotation but axially movable, a second coupling element (4; 34) which is spring loaded towards the second planetary gear stage (16, 26, 27; 46, 56, 57) and by means of which the coupling sleeve (3; 33) can be alternately coupled for rotation with the second planet wheel carrier (17; 47) or the second ring gear (16; 46); wherein the coupling sleeve (3; 33) is provided with a driver stop (3b; 33b) which, on a movement of the coupling sleeve (3; 33) directed from the second towards the first planetary gear stage, drives the second coupling element (4; 34), wherein the coupling sleeve (3; 33) is adapted to be moved by means of a second control element (13; 43) selectively movable along the hub axle (6; 36), and wherein by means of a first control detent arrangement (1b, 24; 31b, 54) the second ring gear (16; 46) and, by means of a second control detent arrangement (1a, 29; 31a, 59), the second planet wheel carrier (16; 46) are coupled, for rotation with the hub sleeve (1; 31), in the forward direction of rotation of the drive member (5; 35).

9. A multispeed drive hub according to claim 8, wherein the drive member (5; 35) carries, axially between the first planetary gear stage (5b, 6a, 7b; 35b, 36a, 37b) and the second planetary gear stage (16, 26, 27; 36, 46, 47), a coupling disc (8; 38) connected for rotation with the drive member (5; 35), wherein the coupling sleeve (2; 32) of the first planetary gear stage (5b, 6a, 7b; 35b, 36a, 37b) carries adjacent axial slots (2b; 32b) through which pass radial coupling arms of the first coupling element (9; 39; 39a), and wherein the coupling disc (8; 38) and the first planet wheel carrier (7; 37) is provided with coupling claws (7a, 8a; 37a, 38a) for the engagement of the coupling arms.

10. A multispeed drive hub according to claim 9, wherein the coupling disc (8; 38) is guided on the drive member (5; 35) to be non-rotatable but axially movable thereon and by means of a spring (20; 50) is axially loaded towards the first planet wheel carrier (7; 37).

11. A multispeed drive hub according to claim 9 wherein the coupling claws (37a) of the first planet wheel carrier (37) are provided with insertion bevels (37c, 37d) for the coupling arms of the first coupling element (39; 39a).

12. A multispeed drive hub according to claim 9, wherein the coupling sleeve (32) is arranged for axial movement and is loaded by a spring (51) towards the first control element (40).

13. A multispeed drive hub according to claim 9 wherein the first planet wheel (37b) is in the form of a step gear which by its wheel (37e) of smaller diameter meshes with the first ring gear and by its wheel (37f) of larger diameter, which axially adjoins the second planetary gear stage (46, 56, 57), meshes with the first sun wheel (36a), and wherein detent toothing (48a) of the brake detent arrangement (48a, 53) is disposed direct on the drive member (35).

14. A multispeed drive hub according to claim 8, wherein the second ring gear (16) is mounted for axial movement and is loaded by a spring (22) in the direction of the first planetary gear stage (5b, 6a, 7b), wherein the second coupling element (4) is adjustable between three positions by means of the coupling sleeve (3) and with the aid of the second control element (13) and determines the position of the second ring gear (16), while the second coupling element (4) is coupled for rotation with the second planet wheel carrier (17) in a first position, which is axially remote from the first planetary gear stage (5b, 6a, 7b), and in a second, middle position, and is coupled for rotation with the second ring gear (16) in a third position close to the first planetary gear stage (5b, 6a, 7b), wherein the second ring gear (16) carries at least one detent (24) of the first control detent arrangement (1b, 24), and wherein the hub sleeve (1) is provided with a control edge (1c) which in the second and third positions of the second ring gear (16) holds the detent (24) of the first control detent arrangement (1b, 24) out of an associated detent toothing (1b), and in the first position frees it for engagement with the detent toothing (1b).

15. A multispeed drive hub according to claim 8, wherein the second coupling element (46) is adjustable between three positions by of the coupling sleeve (33), with the aid of the control element (43), the second coupling element being coupled for rotation with the second planet carrier (46) in a first position axially remote from the first planetary gear stage (35b, 36a, 37b), and in a second middle position and in a third position, axially close to the first planetary gear stage (35b, 36a, 37b), being coupled for rotation with the second ring gear (46), wherein the second ring ear (46) is mounted for axial movement and loaded by a spring (50) in the direction axially away from the first planetary gear stage and carries at least one detent (54) of the first control detent arrangement (31b, 54), wherein a driver stop (34c) is provided by means of which the second coupling element (34) drives the second ring gear (46) on movement from the second position to the third position, and wherein the hub sleeve (31) is provided with a control edge (31c) which in the third position of the ring gear (46) holds the detent (54) of the first con detent arrangement (31b, 54) out of an associated detent toothing (31b) of the hub sleeve (31), and in the st and second positions frees it for engagement with detent toothing (31b).

16. A multispeed drive hub according to claim 8, wherein the second coupling element (34) cooperates with axial coupling claws (47a second planet wheel carrier (47), the coupling claws (47a) having claw ends provided on both sides in the peripheral direction with insertion bevels (47f, 47g).

17. A multispeed drive hub according to claim 1, wherein the hub sleeve (1; 31) is mounted on the drive member (5; 35) axially between the first planetary gear stage (5a, 6a, 7b; 35b, 36a, 37b) and the second planetary gear stage (16; 26, 27; 36, 46, 47).

* * * * *